Patented Mar. 4, 1924.

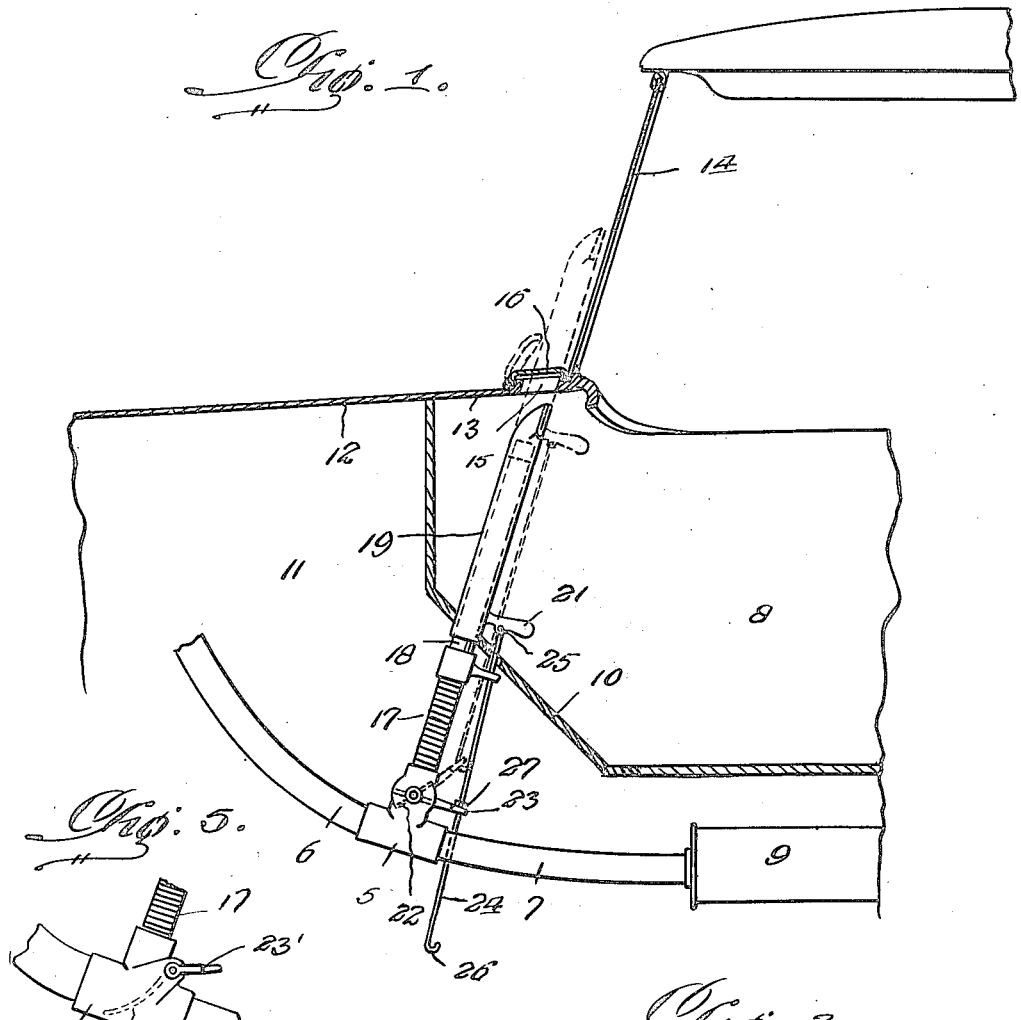

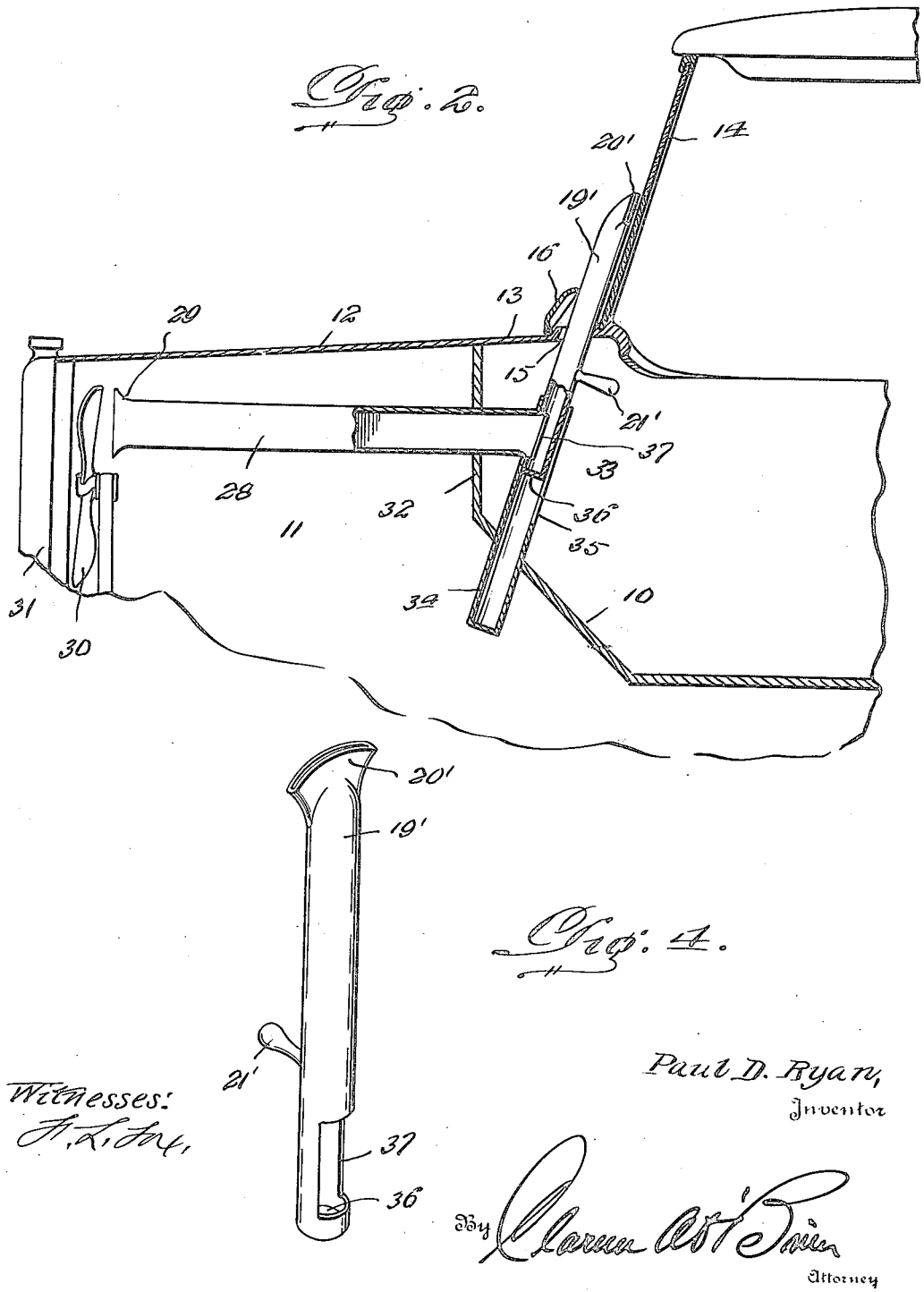

1,485,718

UNITED STATES PATENT OFFICE.

PAUL D. RYAN, OF KENMORE, NEW YORK.

APPARATUS FOR CLEANING GLASS PANELS.

Application filed October 13, 1923. Serial No. 668,357.

*To all whom it may concern:*

Be it known that I, PAUL D. RYAN, a citizen of the United States, residing at Kenmore, in the county of Erie and State of New York, have invented certain new and useful Improvements in Apparatus for Cleaning Glass Panels, of which the following is a specification.

This invention relates to certain new and useful improvements in methods and means for cleaning glass panels and has particular reference to the cleaning of the glass panels of windows, windshields and the like.

The primary object of the invention is to provide a method of the above kind that will be particularly serviceable upon land vehicles, such as automobiles and the like, and through the use of which an effective cleaning operation is insured.

A further object is to provide an apparatus for cleaning glass panels of windows, etc., which embraces the desired qualities of simplicity, durability and efficiency in operation.

Another object of the invention is to provide a windshield cleaning device for motor vehicles embodying a disappearing nozzle on one that moves through the cowl of the vehicle body from operative to inoperative position or vice versa, and means operatively connected to the nozzle for automatically supplying a gaseous medium therethrough when the same is operatively disposed and for cutting off the supply of said medium when the nozzle is lowered or in inoperative position.

Other objects will appear as the nature of the invention is better understood, and the same consists in the novel form, combination and arrangement of parts and in the novel method hereinafter more fully described, shown in the accompanying drawings and claimed.

In the drawings, wherein like reference characters indicate corresponding parts throughout the several views:

Figure 1 is a fragmentary vertical longitudinal sectional view of a motor vehicle with parts removed, having one form of windshield cleaner applied thereto in accordance with the present invention.

Figure 2 is a view similar to Figure 1 of a modified form of the invention.

Figure 3 is a fragmentary enlarged elevational view of the upper end of the nozzle employed in the devices shown in Figures 1 and 2.

Figure 4 is an enlarged perspective view of the nozzle employed in Figure 2, and Figure 5 is a fragmentary elevational view illustrating a modified form of valve for use in conjunction with the apparatus as disclosed in Figure 1.

Briefly described, the present method of cleaning the glass panels of wind shields, windows or the like, consists in passing a jet of gaseous medium across the outer surface thereof at a velocity sufficient to remove rain or snow from the surface.

The form of apparatus for carrying out this method shown in Figures 1 and 3, embraces the provision of a T-fitting 5 between aligned sections 6 and 7 of the exhaust manifold of the internal combustion engine which forms part of the power plant of a motor vehicle, the body of which is generally denoted at 8, said fitting 5 being generally interposed between the engine and the usual exhaust muffler 9. The motor vehicles are usually provided with foot boards as at 10, in front of the driver's seat, an engine compartment 11 in front of the foot board 10, and covered by a hood 12 which extends rearwardly to provide a cowl portion 13 above the foot board 10. Also, at the rear edge of the cowl 13, the usual wind shield 14 is positioned, and the present invention contemplates the provision of an opening as at 15 through the cowl 13 in front of said windshield 14 and normally closed by a suitable cover 16, preferably of the hinged type, as illustrated.

The T-fitting 5 is disposed with the branch thereof projecting upwardly and coupled to a suitable flexible conduit or pipe 17, the upper end of which is suitably coupled to a rigid pipe 18, upon which a tubular nozzle 19 is slidably disposed in a plane parallel with the windshield 14 and slightly forwardly of the latter. The pipe 18 may project through a transversely elongated slot in the foot board 10 for permitting the nozzle to be swung laterally if found desirable, the opening 15 being sufficiently elongated in a transverse direction for permitting the operation if desired. The upper end of the nozzle 19 may be flattened and flared as generally indicated at 20 so as to form an end outlet slot through which a wide jet of gaseous medium may be allowed to flow.

The flattened upper end portion 20 of the nozzle 19 is directed rearwardly slightly as clearly shown in side elevational view by Figure 1, so as to cause the jet of gaseous medium to impinge against the outer surface of the windshield panel and to travel at a high velocity across said surface, for effectively removing the snow or rain therefrom. The end of the nozzle 20 may be of any desired width or form to insure cleaning of a desired portion of a windshield surface, or all of the same, altho the form of nozzle illustrated will result in sufficient surface being cleaned to enable the driver of the vehicle to have a clear vision.

The nozzle 19 is of such length as to enable the same to be completely lowered through the opening 15 to an inoperative position under the cowl 13 as shown by full lines in Figure 1, the nozzle being effectively held against forward or rearward displacement out of alignment with the opening 14 by the foot board 10. The lower portion of the nozzle 19 is provided with a rearwardly extending rigid handle 21, which is within convenient reach of the driver of the vehicle, for being grasped when it is desired to raise the nozzle upwardly through the opening 15 to a position substantially as indicated by dotted lines in Figure 1, wherein the jet will be properly delivered against the outer surface of the windshield panel.

In the form of the invention shown in Figure 1, the upwardly extending flange of the fitting 5 is provided with a pivoted valve 22 that has a rearwardly extending handle 23 through which a depending rod 24 slidably extends, said rod being pivoted at its upper end as at 25 to the handle 21 and having a hooked lower end 26 as well as being provided with a fixed abutment 27 above the arm or handle 23 of the valve. By means of this construction, the nozzle 19 may be raised, until the hooked end 26 of the rod 24 engages the arm 23 so as to swing the valve 22 to open position, the abutment 27 being arranged to engage the upper side of the arm 23 when the nozzle 19 is lowered for causing the valve 22 to be swung to closed position. Obviously, any suitable means may be substituted for the abutment 27 for closing the valve 22. For instance, the arm 23 may be sufficiently heavy to maintain the valve 23 closed, or a spring may be utilized for normally closing the valve 22. The primary object of this construction is to provide means to automatically permit flow of the gaseous medium through the nozzle 19 when the latter is in raised operative position and to automatically cut off the flow of said medium through the nozzle when the latter is lowered to its inoperative position.

The form of the valve 22 and its location are such as to permit part of the exhaust gases to flow to and through the conduit 17 and then through the nozzle 19, while at the same time permitting the remaining portion of the exhaust gases to flow through the pipes 6 and 7 to the muffler 9. As shown in Figure 5, a different arrangement of valves may be employed. In this figure, the pivoted valve 22' is arranged within the fitting 5' so that when the same is in one position as indicated by dotted lines in this figure, the entire volume of exhaust gases are positively directed into the pipe 17 and prevented from flowing to the pipe 7 that connects with the muffler. This valve 22' has an arm 23' similar to the arm 23 for cooperative relation with the rod 24.

Obviously, by providing the nozzle 19 or other suitable part with air intake openings, air may be admitted to be mixed with the exhaust gases for cooling the latter prior to their delivery upon the windshield, so as to thereby prevent destructive heat damaging said windshield.

Referring to the form of the invention shown in Figure 2, 28 indicates a suitable conduit arranged in a substantially horizontal position beneath the hood 12 of the vehicle, and having a flared forward end forming a suitable intake as at 29 terminating at the rear side of the usual fan 30 that is utilized for forcibly drawing air through the cooling radiator 31 of the motor vehicle. This conduit 28 extends rearwardly through the transverse portion 32 of the vehicle, which extends upwardly from the foot board 10 and which divides the body into the engine compartment 11 and the foot compartment 33 beneath the cowl 13. In this form of the invention, the cowl 13 has the opening 15 therein normally closed by the hinged cover 16 and positioned forwardly of the windshield 14.

A tube 34 extends through and is rigidly secured to the foot board 10 in a position wherein the tube lies in a plane parallel with the plane of the windshield 14 but slightly forwardly of the latter, and slidably disposed through the upper end of the tube 34 is a nozzle 19' whose upper end 20' is preferably formed similar to the formation of the end 20 of the nozzle 19. The nozzle 19' is thus mounted for vertical sliding movement in the tube 34 in line with the opening 15, whereby said nozzle 19' may be raised or lowered from or to operative position in substantially the same manner as described above with respect to the nozzle 19. A rigid handle 21' is provided on the nozzle 19' for facilitating raising and lowering of the nozzle by the operator. The tube 34 may be provided with a longitudinal slot, as at 35, in which the handle 21' may move for permitting raising and lowering of the nozzle, and the rear end of the conduit 28 connects with the upper end of the tube 34 as shown clearly in Figure 2, so as to be in interior communication therewith. The lower end of the nozzle 19' is closed in any suitable manner, such as by a bottom wall as at 36, and said nozzle 19' is formed with a slot 37 in the forward side thereof adapted to register with the outlet end of the conduit 28 when the nozzle is raised. It will thus be seen that when the nozzle is raised, as shown by full lines in Figure 2, the fan 30 will force a blast of air through the conduit 28 and nozzle 19', the air passing from the conduit 28 into the nozzle 19' through the slot 37. It will also be seen that when the nozzle 19' is lowered, the rear outlet end of the nozzle 20' is drawn below the cowl and covered by the hinged cover 16, and the supply of the gaseous medium to the nozzle thereby cut through the slot 37 being positioned out of alignment with the conduit 28.

In both forms of the invention, means is thus provided for effectively passing a jet of gaseous medium across the outer surface of the windshield at a velocity sufficiently high to remove rain or snow therefrom. Also, in each instance, the device embodies a vertically movable nozzle normally disposed below the cowl and movable through the latter, provision being made for automatically cutting off the supply of the gaseous medium when the nozzle is lowered to an inoperative position and for establishing such flow when the nozzle is raised.

From the above description, it is believed that the construction and operation, as well as the advantages of the invention will be readily understood and appreciated by those skilled in the art.

Minor changes may be made without departing from the spirit and scope of the invention as claimed.

What I claim as new is:

1. A windshield cleaner for motor vehicles, wherein the vehicle is provided with a cowl, having an opening forwardly of the vehicle wind shield, a vertically movable nozzle normally disposed beneath the cowl and movable upwardly through said opening in position to supply a jet of gaseous medium across the outer surface of the windshield, and means to operatively associate said nozzle with an operative part of the motor vehicle from which a supply of said gaseous medium may be derived.

2. A windshield cleaner for motor vehicles wherein the vehicle is provided with a cowl, having an opening forwardly of the vehicle wind shield, a vertically movable nozzle normally disposed beneath the cowl and movable upwardly through said opening in position to supply a jet of gaseous medium across the outer surface of the windshield, means to operatively associate said nozzle with an operative part of the motor vehicle from which a supply of said gaseous medium may be derived, and wherefrom the supply of said medium is continuous, means to automatically place said medium supplying means in communication with the nozzle when the latter is raised through the cowl to operative position, and means to automatically disconnect the nozzle from said medium supplying means when the nozzle is lowered beneath the cowl to its inoperative position.

In testimony whereof I affix my signature.

PAUL D. RYAN.